Figure 1:
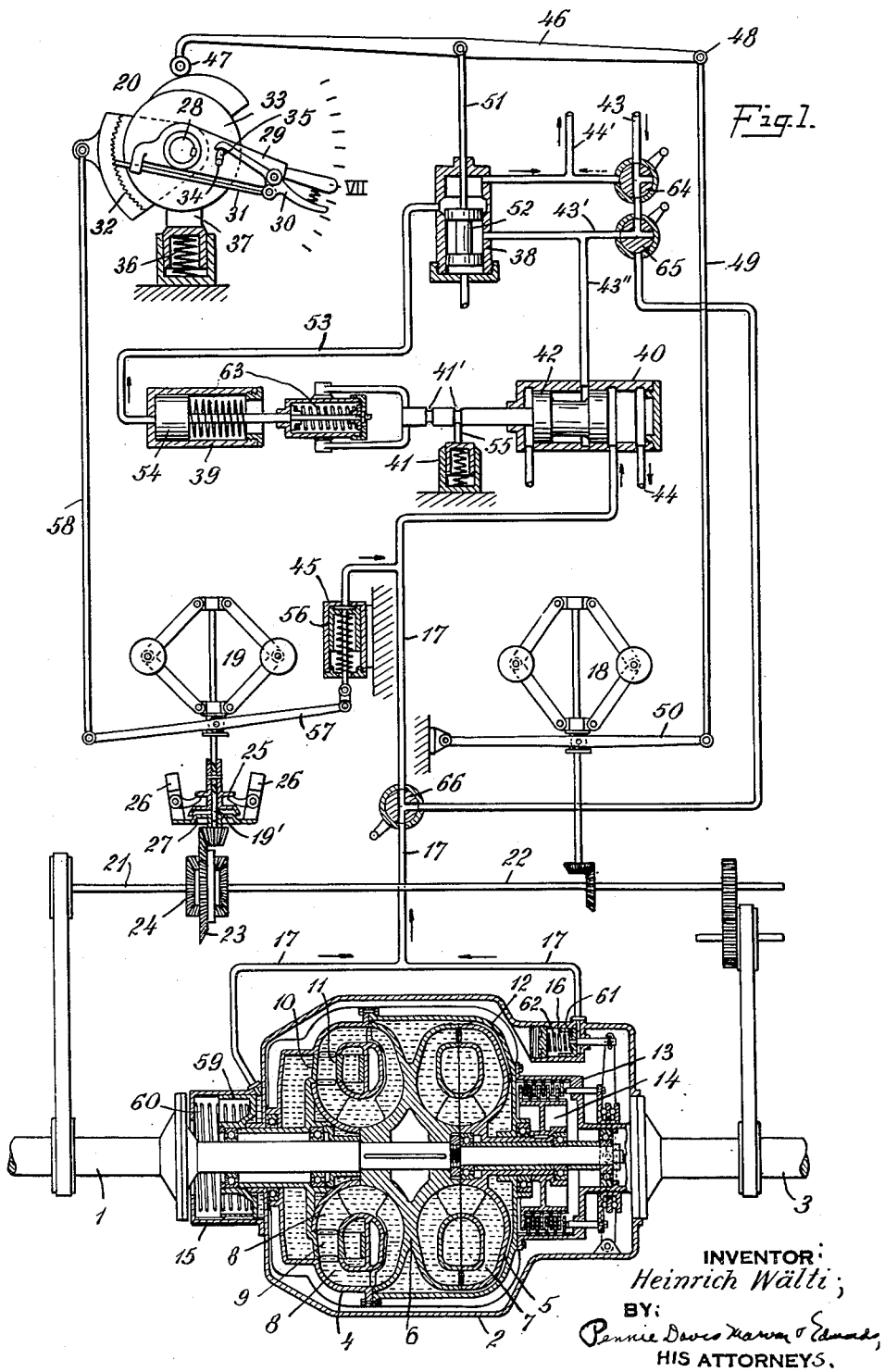

Aug. 10, 1937.  H. WÄLTI  2,089,590
CONTROL APPARATUS FOR HYDRAULIC CHANGE SPEED MECHANISM
Filed July 11, 1934  2 Sheets-Sheet 1

INVENTOR:
Heinrich Wälti;
BY:
Pennie Davis Marvin & Edmonds,
HIS ATTORNEYS.

Aug. 10, 1937.  H. WÄLTI  2,089,590
CONTROL APPARATUS FOR HYDRAULIC CHANGE SPEED MECHANISM
Filed July 11, 1934  2 Sheets-Sheet 2

INVENTOR:
Heinrich Wälti;
BY:
HIS ATTORNEYS.

Patented Aug. 10, 1937

2,089,590

UNITED STATES PATENT OFFICE 2,089,590

CONTROL APPARATUS FOR HYDRAULIC CHANGE SPEED MECHANISM

Heinrich Wälti, Winterthur-Wuelflingen, Switzerland

Application July 11, 1934, Serial No. 734,576
In Switzerland December 22, 1933

15 Claims. (Cl. 60—54)

The present invention relates to the control of apparatus for the transmission of power between two shafts, a driving and a driven shaft which, for a portion of the time at least, must operate at different rotational speeds. More particularly the invention relates to the control of power transmitting apparatus of the kind which is capable of selective operation, either as a hydraulically operated torque-transformer, or as a coupling. Such power transmitting apparatus may be used, for example, for the purpose of transmitting the power of an internal combustion engine to the wheels of a vehicle, and is capable of producing a smooth starting and operation of the vehicle. Such an apparatus is frequently referred to as a hydraulic change-speed gear, and may be used in place of change-speed gears in which toothed gearing is employed.

Hydraulic change-speed gears of this sort operate as a torque transformer during the starting of the driven shaft and during the period while this shaft is being brought up to the speed at which the driving shaft is operating, after which the change-speed gear is operated as a coupling, either hydraulic or mechanical, or a combination of the two. During the operation of the apparatus as a coupling, the speeds of rotation of the driving and driven shafts are the same, or substantially the same.

The present invention is directed to the provision of apparatus for automatically controlling the operation of a hydraulic change-speed gear of the type just described in such a way that the transition or conversion from operation as a torque-transformer to operation as a coupling will take place at the proper time during the acceleration of the driven shaft, and conversely, so that the re-conversion of the operation from that of coupling to that of a torque-transformer will be suitably carried out whenever the speed of the driven shaft is sufficiently reduced.

Another object of the invention is to provide for the regulating of the speed at which conversion takes place in accordance with the torque applied to the driving shaft, so that when the power transmission apparatus is operating at low torque on the driving shaft, the conversion will take place at comparatively low speed, and when the apparatus is operating with high torque on the driving shaft, the speed of conversion will be proportionately increased.

A further object of the invention is to suitably control the torque on the driving shaft applied thereto by the internal combustion engine, or other driving means, during and subsequent to the conversion of the operation of the power transmitter, either from torque-transformer operation to coupling operation, or vice versa.

Other objects and advantages of the present invention will appear from the following description of an advantageous working embodiment illustrated in the accompanying drawings. The invention is, however, limited in its embodiments only by the scope of the sub-joined claims.

Figure 2:
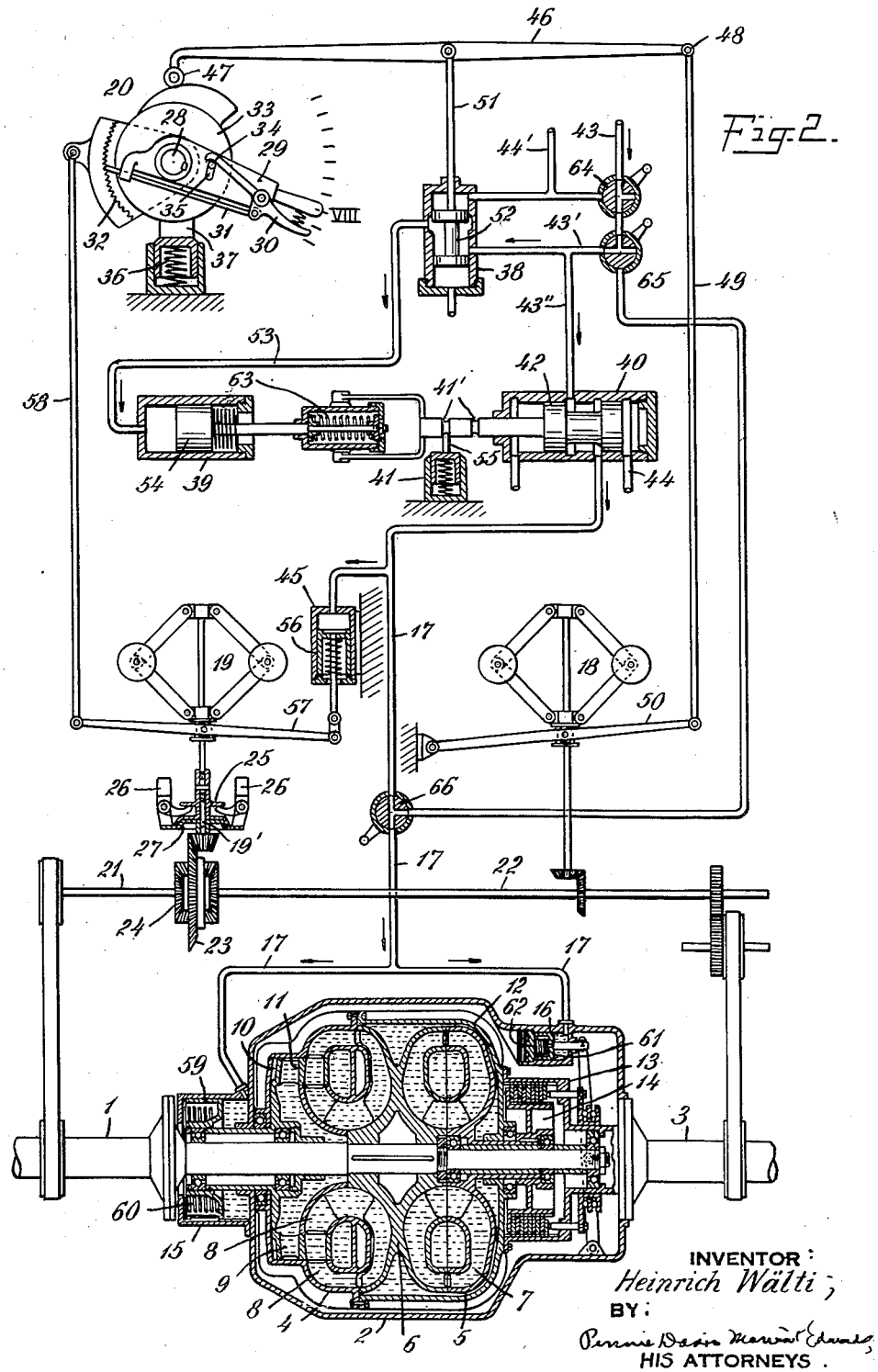

In the drawings,

Fig. 1 is a diagrammatic spread-view of the compact assembly constituting one form of the present invention, and Fig. 2 is a similar view of same with some of the moving parts in different operational positions.

With the parts in the position shown in Fig. 1, power is transmitted from the crankshaft 1 of an internal combustion engine (not shown) through the hydraulic change speed mechanism proper, generally indicated at 2, to a driven shaft 3, whence the power is transmitted through suitable mechanism, to the road wheels of a vehicle, for example. The hydraulic change speed gear 2 comprises a hydraulic torque-transformer generally indicated at 4, and a hydraulic coupling generally indicated at 5. A pump impeller 6 keyed to the driving shaft 1 cooperates with a rotor or turbine wheel 7 of the coupling 5, and with a rotor or turbine wheel 8 constituting part of the torque-transformer 4, which also includes a distributing or guide wheel 9. The guide wheel 9 comprises two rims 10 and 11, the rim 10 being furnished with blades, while the rim 11 has radially-extending, open passages.

The turbine wheel 8 of the torque-transformer 4 is rigidly secured to the driven shaft 3 through housings 12 and 13, while the turbine wheel 7 of the hydraulic coupling 5 can be coupled to the driven shaft 3 by means of a friction clutch 14. The guide wheel 9 is movable axially relatively to the turbine wheel 8 by means of a servomotor 15, while the friction clutch 14 can be operated by a servomotor 16, the two servomotors 15 and 16 being supplied with pressure medium through a supply system 17.

The presently devised control mechanism for this type of hydraulic change speed gear comprises a governor 18 operated in accordance with the speed of the driven shaft 3; a second governor 19 operated in accordance with the difference between the speeds of the driving and driven shafts 1 and 3; and a torque-regulating device 20 which is hereinafter described.

A shaft 21 is driven by the driving shaft 1 in a direction opposite to that in which a shaft 22, driving the governor 18, is driven by the shaft 3, the shafts 21 and 22 driving a differential gear 24, the crown wheel 23 of which meshes with a pinion carried on the shaft 19' of the governor 19. Thus, when the speeds of the shafts 21 and 22 are the same in amount but in opposite directions, the crown wheel 23 will not rotate, and the sleeve of the governor 19 will remain in its lowermost position. With a view to avoiding damage to the governor 19 when large differences between the speeds of the shafts 21 and 22 occur, a safety device 25 is provided which, under the action of centrifugal force acting on weights 26, disengages a friction clutch 27 so that the speed of the governor 19 cannot rise above a predetermined value.

The torque regulating device 20 comprises a spindle 28 which, when rotated, varies the quantity of fuel supplied to the engine. Keyed to the spindle 28 is a fuel-setting lever 29 whereby the quantity of fuel supplied to the engine, and therefore the torque developed thereby, can be adjusted. Secured to the setting-lever 29 is a second lever 30, whereby a pawl 31 can be moved out of engagement with a toothed quadrant 32. The quadrant 32 and also a cam disc 33 are independently rotatable on the spindle 28, and the toothed quadrant 32 can be locked in any desired position relatively to the setting lever 29 by disengaging the pawl 31 and moving the setting lever 29, the cam disc 33 being coupled to the setting lever 29 by means of a pin 34 carried on the cam disc 33 and engaging an elongated slot 35 in the setting lever 29. When the lever 30 is moved to disengage the pawl 31 from the quadrant 32 for the purpose of initially setting the lever 29, a nose on the lever 30 is moved against the pin 34, so that this pin always lies in the lower end of the slot 35 when the lever 30 is released. With a view to preventing unintentional rotation of the cam disc 33, a spring 36 is provided and acts on a brake pad 37, which bears on the circumferential edge of the cam disc 33.

The regulating apparatus also includes a piston valve 38, servomotor 39, and piston valve 40. Arranged between the piston valve 40 and the servomotor 39 is a spring-controlled snap latch 41 adapted to snap into engagement with one or the other of two annular grooves 41' formed in the rod of the piston 42 constituting the control member of the valve 40. In this way, the piston 42 will assume either of two end positions within its cylinder, the piston 42 passing rapidly between these two end positions, as hereinafter described. Pressure medium is supplied to the control valves 38 and 40 through main supply pipes 43, 43', and 43'', while medium can be released from these valves through discharge pipes 44 and 44'. A servomotor 45, subject to the pressure within the pipe system 17, is provided for influencing the torque developed by the internal combustion engine when the hydraulic torque-transformer 4 operates as a hydraulic coupling. A floating lever 46 having a roller 47 at one end bearing on the cam disc 33 is connected at the other end 48 by a rod 49 to a lever 50 moved by the sleeve of the governor 18.

With this arrangement of the parts in mind, the operation of the apparatus is as follows: When the vehicle is to be started, the setting lever 29 is moved, for example to the Division VII on the scale as shown in Figure 1, so as to increase the fuel charge of the internal combustion engine. At first, the driving shaft 1 turns over at a predetermined speed, and the shaft 3 remains stationary, the engine being prevented from racing due to the fact that as the speed of rotation of the driving shaft 1 increases the reaction torque transmitted through the torque-transformer 4, which rises approximately in accordance with the third power of the speed. Since the driven shaft 3 has not yet commenced to rotate, the shaft 22 is stationary, while the shaft 21 is rotating at high speed. The difference between the speeds of the two shafts 21 and 22 will therefore be high, and the sleeve of the governor 19 will rise up to, or near, the maximum level permitted by the safety device 25. Since the governor 18 is not yet rotating, its sleeve, and therefore the lever 50, will be in the lowermost position shown in Figure 1, and the lever 46 will also be in its lowermost position.

The floating lever 46 is connected by a rod 51 to the piston 52 of the valve 38, so that the piston 52 will now be held in its lowermost position, whereby pressure medium within the servomotor 39 will be released through a pipe 53 to the discharge pipe 44', the piston 54 of the servomotor 39 being thus moved to the left, as shown in the drawings, by its control spring. The piston 42 of the valve 40 will therefore be in the left-hand position shown in Figure 1, and will be locked in this position by pin 55 of the latching device 41 engaging one of the grooves 41' in the rod of the piston 42. The pipe 17 is now in communication through the valve 40 with the discharge pipe 44, while the piston 56 of the servomotor 45 is held in its raised position by its control spring. The lever 57, operatively connected to the sleeve of the governor 19, is thus held raised at one end, the other end of the lever 57 being connected by a rod 58 to the quadrant 32.

The piston 59 of the servomotor 15 is now held to the right, as shown in the drawings, by its control spring 60, so that the bladed rim 10 of the guide wheel 9 is put into the path of the liquid of the hydraulic torque-transformer 4, the piston 61 of the servomotor 16 being held by its control spring 62 so as to maintain the friction coupling 14 inoperative. Power is therefore transmitted from the driving shaft 1 to the driven shaft 3 solely through the torque-transformer 4.

The shaft 3 now commences to rotate, and as the vehicle accelerates, the shaft 22 will rotate and the sleeve of the governor 18 will rise, so that the end 48 of the floating lever 46 will be lifted. As the speed of the driven shaft 3 increases, therefore, the piston valve 52 will rise and first cut off communication between the pipe 53 and the discharge pipe 44, and then establish communication between the supply pipes 43, 43' and the pipe 53. The piston 54 will now commence to move to the right, so as to compress a spring 63. The pin 55 will prevent the piston 42 from moving to the right until the spring 63 has been compressed to a predetermined extent, whereupon the piston valve 42 will snap to the right from the position shown in Figure 1 to that shown in Figure 2. In this way, communication between the pipe 17 and the discharge pipe 44 will be broken, and communication established between the supply pipes 43, 43', 43'' and the pipe 17. The two pistons 59 and 61 of servomotors 15 and 16, respectively will in this way be moved to the left, as viewed in the drawings, so that they will now take up the positions shown in Figure 2. The part 10 of the guide wheel 9 will therefore be moved out of the liquid circuit, so that the guide wheel 9 will be inoperative and the torque-transformer 4 will operate as a hydraulic coupling. At the same time the friction clutch 14 will be engaged, so that the power will be transmitted from the driving shaft 1 to the driven shaft 3, partly by the hydraulic coupling 5 and partly by the hydraulic torque-transformer 4 now acting as a hydraulic coupling.

When pressure medium is admitted to the pipe 17 as above described, the piston 56 forces one end of the lever 57 downwards, and the rod 58 connected to the other end of the lever 57 turns the toothed quadrant 32 about the spindle 28, thereby advancing the fuel setting lever 29 towards the position VIII of the spindle 28, as shown in Figure 2, and thus increasing the quantity of fuel supplied to the engine. The torque developed by the engine is thus increased, but on further acceleration of the vehicle, the difference in the speeds of the driving and driven shafts will be still less, so that the sleeve of the governor 19 will fall and the fuel charge, previously increased by the servomotor piston 56, will be now reduced. It will be noted that the cam disc 33 is not rotated when the quadrant 32 is moved due to actuation of the piston 56, since there is lost motion between the pin 34 and the slot 35, and the cam disc 33 is prevented from rotating by the spring-brake-shoe 37. In this way, temporary increase of the torque developed by the engine when the hydraulic torque-transformer 4 is caused to operate as a hydraulic clutch does not cause a corresponding movement to be transmitted to the regulating apparatus 38, 39, 40 through the lever 46, and hence prevents re-conversion of the transmission apparatus back to transformer operation.

If now the speed of the vehicle is reduced, for example when the load is increased due to a steeper gradient, the sleeve of the governor 18 will move downwards. When this sleeve has descended to such an extent that the piston valve 52 again passes downwards over the port leading to the pipe 53, the pistons 42 and 54 will be moved to the left into the position shown in Figure 1, whereby the hydraulic coupling 5 will be rendered inoperative and the guide wheel 9 will be rendered operative, so that the hydraulic torque-transformer 4 will again operate as such.

Further explaining the operation of the apparatus during acceleration of the vehicle and change-over from torque-transformer operation to coupling operation, governor 19 rises to its maximum height at a comparatively low speed of shaft 21, and hence promptly after fuel-setting lever 29 is moved from the "off" position to position VII. Therefore, almost immediately after fuel lever 29 is moved to position VII, quadrant 32 is raised to its normal position and remains in this position while the speed of shaft 1 increases to its normal operating speed. Quadrant 32 remains in this normal raised position until the speed of driven shaft 3 increases sufficiently to cause governor 18 to effect change-over, or conversion, at which time piston 56 is caused to descend to the position shown in Fig. 2, thereby raising quadrant 32 to a position above normal, and increasing the fuel to the engine, and consequently increasing the torque on shaft 1. At this time, the difference between the speeds of shafts 21 and 22 is still sufficient to cause governor 19 to remain at its maximum height. After change-over, however, the speed of the driven shaft 3 approaches still closer to that of driving shaft 1 and the speed of shaft 22 rises to a point where the difference between its speed and that of shaft 21 is no longer sufficient to keep governor 19 in its raised position, and quadrant 32 will be lowered to about the position shown in Fig. 1, thereby reducing the torque to approximately its original value.

The shape of the cam disc 33 is such that with a small fuel charge, that is to say, with a small engine torque, conversion of the transmission apparatus from operation as a torque-transformer to operation as a coupling will take place at a relatively low absolute speed of driven shaft 3 and of the vehicle. Further, re-conversion from operation as a coupling to operation as a torque-transformer will also take place at low speeds of the driven shaft 3. After conversion from operation as a torque-transformer to operation as a coupling, the speed of the engine will fall to the value determined by the setting of the cam disc 33. The transmission apparatus will then have a transmission characteristic equivalent to that of a hydraulic coupling, so that the speed of rotation of the driven shaft 3 will not differ very appreciably from the speed of the driving shaft 1, and the sleeve of the governor 19 will not rise appreciably.

With a view to providing for control of the change-speed gear in the event of a breakdown occurring in the control mechanism, manually controlled devices 64, 65 and 66 are provided, so that if necessary the supply and discharge of pressure medium to and from the pipe 17, and therefore the conversion of the hydraulic torque-transformer 4 acting as such to action as a hydraulic coupling, can be effected by hand. The gear is preferably so constructed that even with maximum torques power can still be transmitted without any appreciable difference between the speeds of the driving and driven shafts.

I claim:

1. The combination of a hydraulic change-speed gear, having driving and driven shafts and operable selectively as a torque-transformer or as a coupling, and means influenced by the torque on the driving shaft and by the speed of the driven shaft for selectively controlling the operation of said apparatus either as a torque-transformer or as a coupling.

2. The combination of a hydraulic change-speed gear having driving and driven shafts and operable selectively as a torque transformer or as a coupling, means responsive to the speed of the driven shaft for converting the operation of said apparatus at a predetermined speed of said driven shaft from transformer operation to coupling operation, and vice versa, means for varying the torque on said driving shaft, and means for varying the conversion speed in accordance with the torque on said driving shaft.

3. The combination of a hydraulic change-speed gear having driving and driven shafts and operable selectively as a torque transformer or as a coupling, means operable upon increase of the speed of the driven shaft to a predetermined value for converting the operation of said apparatus from that of a torque transformer to that of a coupling, and means for temporarily increasing the torque on said driving shaft approximately simultaneously with said conversion.

4. The combination of a hydraulic change-speed gear having driving and driven shafts and operable selectively as a torque transformer or as a coupling, means operable upon increase of the speed of the driven shaft to a predetermined value for converting the operation of said apparatus from that of a torque-transformer to that of a coupling, means for temporarily increasing the torque on said driving shaft approximately simultaneously with said conversion, means operable upon decrease of the speed of the driven shaft to convert the operation of said apparatus to that of a torque-transformer, and means for temporarily decreasing the torque on said shaft approximately simultaneously with said reconversion.

5. In a hydraulic change-speed gear having driving and driven shafts and operable selectively as a torque-transformer or as a coupling, a device operative in accordance with the torque of the driving shaft, a device operative in accordance with the angular velocity of the driven shaft, and a device operative under the combined influences of said torque and said speed operated devices for selectively controlling the operation of said apparatus as a torque transformer or as a coupling.

6. The combination of a hydraulic change-speed gear having driving and driven shafts and operable selectively as a torque-transformer or as a coupling, means responsive to the speed of the driven shaft for causing said apparatus to operate either as a torque-transformer or a coupling, and means responsive to the difference between the speeds of the driving and driven shafts for controlling the torque on the driving shaft.

7. The combination of a hydraulic change-speed gear having driving and driven shafts and operable selectively as a torque-transformer or a coupling, means responsive to the speed of the driven shaft and adapted to operate at a predetermined speed thereof for causing the operation of said apparatus to change from that of a torque-transformer to that of a coupling, and vice versa, a speed responsive device responsive to the difference between the speeds of the driving and driven shafts for controlling the torque on the driving shaft, and means for varying the torque on said driving shaft approximately simultaneously with the occurrence of said change.

8. The combination of a hydraulic change-speed gear having driving and driven shafts and operable selectively as a torque-transformer or as a coupling, means for converting the operation of said apparatus from that of a torque-transformer to that of a coupling and vice versa, and mechanically operated means for temporarily increasing the torque on said driving shaft approximately simultaneously with said conversion.

9. The combination of a hydraulic change-speed gear having driving and driven shafts and operable selectively as a torque-transformer or as a coupling, means for converting the operation of said apparatus from that of a torque-transformer to that of a coupling and vice versa, means actuated substantially simultaneously with the operation of said converting means for increasing the torque on the driving shaft, and means for thereafter reducing said torque.

10. The combination of a hydraulic change-speed gear having driving and driven shafts and operable selectively as a torque-transformer or as a coupling, means for converting the operation of said apparatus from that of a torque-transformer to that of a coupling and vice versa, means actuated substantially simultaneously with the operation of said converting means for increasing the torque on the driving shaft, and means actuated by the difference between the speeds of the driving and driven shafts for thereafter reducing said torque.

11. The combination of a hydraulic change-speed gear having driving and driven shafts and operable selectively as a torque-transformer or as a coupling, a device for regulating the torque of the driving shaft capable of being set to produce a predetermined torque therein, a device responsive to the speed of the driven shaft, means operative under the combined influences of said devices for converting the operation of said apparatus from torque-transformer operation to coupling operation and vice versa, a device responsive to the difference between the speeds of the driving and driven shafts, means connecting said last named device with the torque regulating device to change the setting of the latter approximately simultaneously with said conversion, and means for preventing such change in setting of the torque-regulating device from causing re-conversion of the apparatus from coupling operation to torque-transformer operation or vice versa.

12. In a change-speed gear operable selectively as a torque transformer or as a coupling, a driving shaft, a driven shaft, means responsive to the speed of the driven shaft for converting the operation of said apparatus at a predetermined speed of said driven shaft from transformer operation to coupling operation, means for varying the speed of the said driving shaft, and means for varying the conversion speed in accordance with the speed of said driving shaft.

13. In a change-speed gear operable selectively as a torque transformer or as a coupling, a driving shaft, a driven shaft, means for converting the operation of said apparatus from that of a torque transformer to that of a coupling, and mechanically operated means for temporarily increasing the torque on said driving shaft substantially simultaneously with said conversion.

14. In a hydraulic change-speed gear having driving and driven shafts and operable selectively as a torque-transformer or as a coupling, means for converting said apparatus from operation as a torque-transformer to operation as a coupling, and control mechanism including a torque-control device, said mechanism operating to increase the torque on the driving shaft at the operation of said converting means and to thereafter reduce said torque in accordance with the reduction of the difference between the angular velocities of the driving and the driven shafts.

15. In a hydraulic change-speed gear having driving and driven shafts and operable selectively as a torque-transformer or as a coupling, means for converting said apparatus from operation as a torque-transformer to operation as a coupling, means to increase the torque on the driving shaft at the operation of said converting means, and means for thereafter reducing said torque in accordance with the reduction of the difference between the angular velocities of the driving and the driven shafts.

HEINRICH WÄLTI.